United States Patent
Pignataro, Jr.

[11] Patent Number: 5,834,083
[45] Date of Patent: Nov. 10, 1998

[54] USED TIRE RECYCLING INCLUDING SORTING TIRES, SHREDDING SIDEWALLS, STACKING TREAD STRIPS, AND UNIFORMLY DIMENSIONING AND BONDING THE TREAD STRIPS TOGETHER

[76] Inventor: Alfred J. Pignataro, Jr., 53 Martin Dr., Lincroft, N.J. 07738

[21] Appl. No.: 799,049

[22] Filed: Feb. 10, 1997

Related U.S. Application Data

[62] Division of Ser. No. 710,500, Sep. 18, 1996, abandoned.

[51] Int. Cl.⁶ .................................................. B32B 3/10
[52] U.S. Cl. ............................. 428/61; 428/58; 428/119; 428/903.3; 52/DIG. 9
[58] Field of Search ........................... 428/58, 61, 903.3, 428/119; 52/DIG. 9

[56] References Cited

U.S. PATENT DOCUMENTS

| | | | |
|---|---|---|---|
| 4,785,577 | 11/1988 | Lederbauer | 47/33 |
| 4,965,115 | 10/1990 | Cimillo | 428/131 |
| 5,094,905 | 3/1992 | Murray | 428/218 |
| 5,131,787 | 7/1992 | Goldberg | 404/32 |
| 5,214,897 | 6/1993 | Nordberg | 52/586 |
| 5,235,888 | 8/1993 | Dom | 83/420 |
| 5,236,756 | 8/1993 | Halliburton | 428/65 |
| 5,238,734 | 8/1993 | Murray | 428/292 |
| 5,246,754 | 9/1993 | Miller | 428/36.91 |
| 5,258,222 | 11/1993 | Crivelli | 428/323 |
| 5,340,630 | 8/1994 | Tripp | 428/54 |
| 5,412,921 | 5/1995 | Tripp | 52/729 |
| 5,468,539 | 11/1995 | Crivelli | 428/141 |
| 5,472,750 | 12/1995 | Miller | 428/2 |
| 5,535,480 | 7/1996 | Neumann et al. | 16/42 R |

*Primary Examiner*—Alexander Thomas
*Attorney, Agent, or Firm*—Cobrin Gittes & Samuel

[57] ABSTRACT

Used tires are sorted on-site to separate those which are still good from those that are scrap. At the site, the sidewalls are separated from each scrap tire and the remaining tire portion is slit transversely and laid flat, stacked one atop the other. The stack is transported by vehicle from the site to a central processing facility that shears the tire portions to a uniform width and thickness. The uniformly dimensioned tire portions are then connected into strips by male/female dovetail cuts. Two strips are bonded together at their flat inner tire sides to form a two-ply tread strip. The two-ply tread strips are then used in construction, building component manufacture, fencing or landscaping; the two-ply treads are more flexible then lumber. The sidewalls are used as landfill or grounds cover in landscaping.

12 Claims, 10 Drawing Sheets

FIG. 30 ary composed of used tire recycling. The used tires are sorted at a tire dumpsite to separate those
USED TIRE RECYCLING INCLUDING SORTING TIRES, SHREDDING SIDEWALLS, STACKING TREAD STRIPS, AND UNIFORMLY DIMENSIONING AND BONDING THE TREAD STRIPS TOGETHER This is a Continuation of application Ser. No. 08/710,500, filed Sep. 18, 1996 now abandoned.

BACKGROUND OF THE INVENTION

1. Field of the Invention

The present invention relates to used tire recycling. The used tires are sorted at a tire dumpsite to separate those which are still good from those that are scrap. The sidewalls are cut off, debeaded and shredded. The remaining tire portions are transported by vehicle to a central recycling facility that shears the portions to a uniform width and thickness. The uniformly dimensioned portions are then connected end to end into strips using male/female dovetail cuts. Two strips are bonded together at their flat inner tire sides to form a two-ply tread strip. The two-ply tread strips are then used as construction materials and in landscaping; the two-ply tread strips are more flexible than lumber of the same dimension. The shredded sidewalls are used as landfill, playground safety cover, or ground cover for landscaping.

2. Discussion of Related Art

The typical automobile tire is composed of sidewalls, treads and steel beads. The sidewalls are primarily made of soft, synthetic or rubber material, but the treads generally are composed of synthetic material containing metallic fiber and belts.

Conventionally, discarded tires are transported by truck from a tire dumpsite to a central recycling facility. The tipping fees charged for receiving the tires are based on the weight of the tires themselves. Municipalities that run such dumpsites and want to save money generally hire workers to remove rain water from the tires, thereby lessening the overall weight and thus the tipping fees. Otherwise, the municipalities would be paying for the added weight from rain water that collects in the used tires, which could represent 30–40% of the overall weight.

The current manner of transporting the tires to the recycling facility neither avoids waste nor inefficiency. First, both scrap tires as well as good, but used, tires are transported to the recycling facility which treats both as scrap. Thus, good tires that could be kept out of the recycling processing stream for a while longer are recycled. Second, the tires themselves waste space on the transport vehicle because of their donut shape, thereby limiting the number of tires that may be transported each trip to the volume taken up by the tire with surrounding space, rather than to the volume available on the transport vehicle for carrying the tires.

Good, but used, tires often wind up at the dumpsite as a result of disposal of the vehicle to which they were attached. The owner generally has no further need for the tires if the replacement vehicle purchased by the owner requires a different size tire. Treating such a tire as scrap is therefore wasteful.

Steel belted tires are difficult to process for recycling because separating the rubber material from the steel belts poses difficulties, thereby hindering the recycling of rubber material separate from the steel belts. While conventional techniques exist to separate the synthetic material from the steel belts, the techniques are expensive and time consuming.

Some conventional uses for scrap tires call for cutting the treads from the sidewalls and then processing the treads for various applications. For instance, U.S. Pat. No. 5,340,630 describes bonding tread strips together tread face to tread face as a two-ply strip and using them in columns, I-beams, planks, posts, boards and beams. Conventionally, scrap truck tires have been flattened for use in roofing in which they are overlapped in an alternating tread-out tread-in pattern to form a watertight seal. Where the tires are shredded, the shredded material has been used as landfill or in roadways.

SUMMARY OF THE INVENTION

One aspect of the invention relates to a method of sorting used tires from scrap tires to remove the used tires from the waste stream and process the scrap tires into strips useful for other applications. The processing involves slitting the scrap tires to separate the tread from the two sidewalls, stacking the treads one atop the other, debeading the sidewalls, shredding the debeaded sidewalls, shearing the treads to provide uniform thickness and width, connecting the treads end-to-end to form strips, and stitching the end to end connections.

The stitched strips are then buffed on the ridge side of the tread to remove the ridges and chemical release agents from the original manufacture and two of the strips are bonded together buffed ridge side to buffed ridge side so as to form a two-ply tread strip. Note that when the tire was previously mounted to a vehicle wheel, the "ridge side" faced the wheel itself, while the "tread side" faced outwardly. The tread sides are buffed and then bonded together to form a bundle. Holes are made in the bundle and mechanical fasteners inserted into the holes to retain the bundle to connecting inserts, which in turn connect with other bundles in a like manner.

BRIEF DESCRIPTION OF THE DRAWINGS

For a better understanding of the present invention, reference is made to the following description and accompanying drawings, while the scope of the invention is set forth in the appended claims.

DESCRIPTION OF THE PREFERRED EMBODIMENT

A mobile tire remover arrives at a tire dumpsite for processing. The mobile tire remover includes a truck, trailer and cutting and loading equipment.

Culling tires involves sorting those that are dangerous to use in driving and thus scrap from those that are used but still have life yet for use in driving. Whether or not a tire is still acceptable for driving purposes depends upon the level of wear of the treads. Tire manufacturers generally provide a marking as a wear indicator within the pattern of the treads which, when visible due to being sufficiently worn, signifies that the tire is in need of replacement because the tire is no longer considered safe for use in driving. Typically, this wear indicator is seen as the disappearance of the tread definition at the $2/32$ inch level. A used tire is generally considered useful and still safe to drive with if the tread height is at $4/32$ inches. Thus, culling results in the removal from the waste stream of tires with inherent value aside from scrap their value. Also, some types of older tires or their replicas that were unique in their own right, such as whitewalls, may be salvaged and removed from the waste stream, because of their inherent value to suppliers of tires for that niche market.

Figures 1, 3:
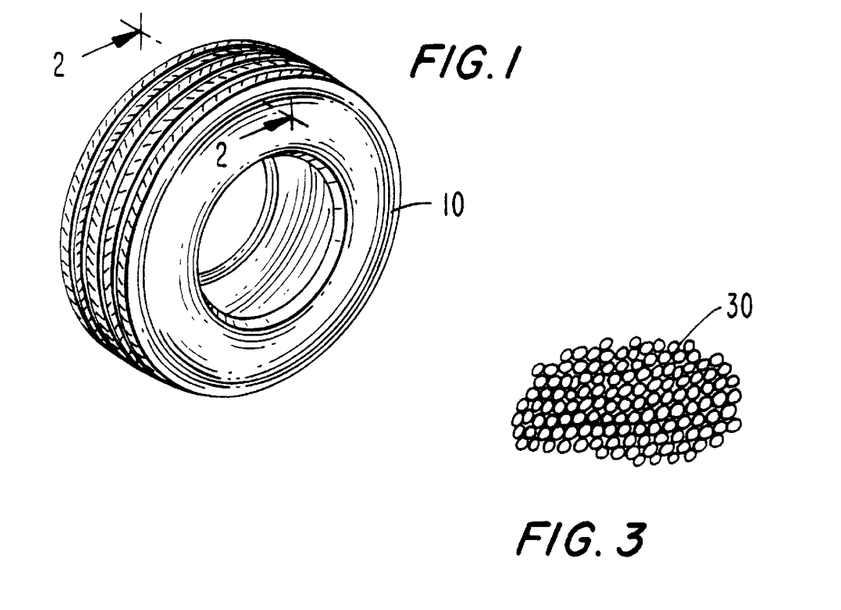
FIG. 1 is a perspective view of a conventional tire.
FIG. 3 is a top view of shredded tire sidewalls.
Figure 2:
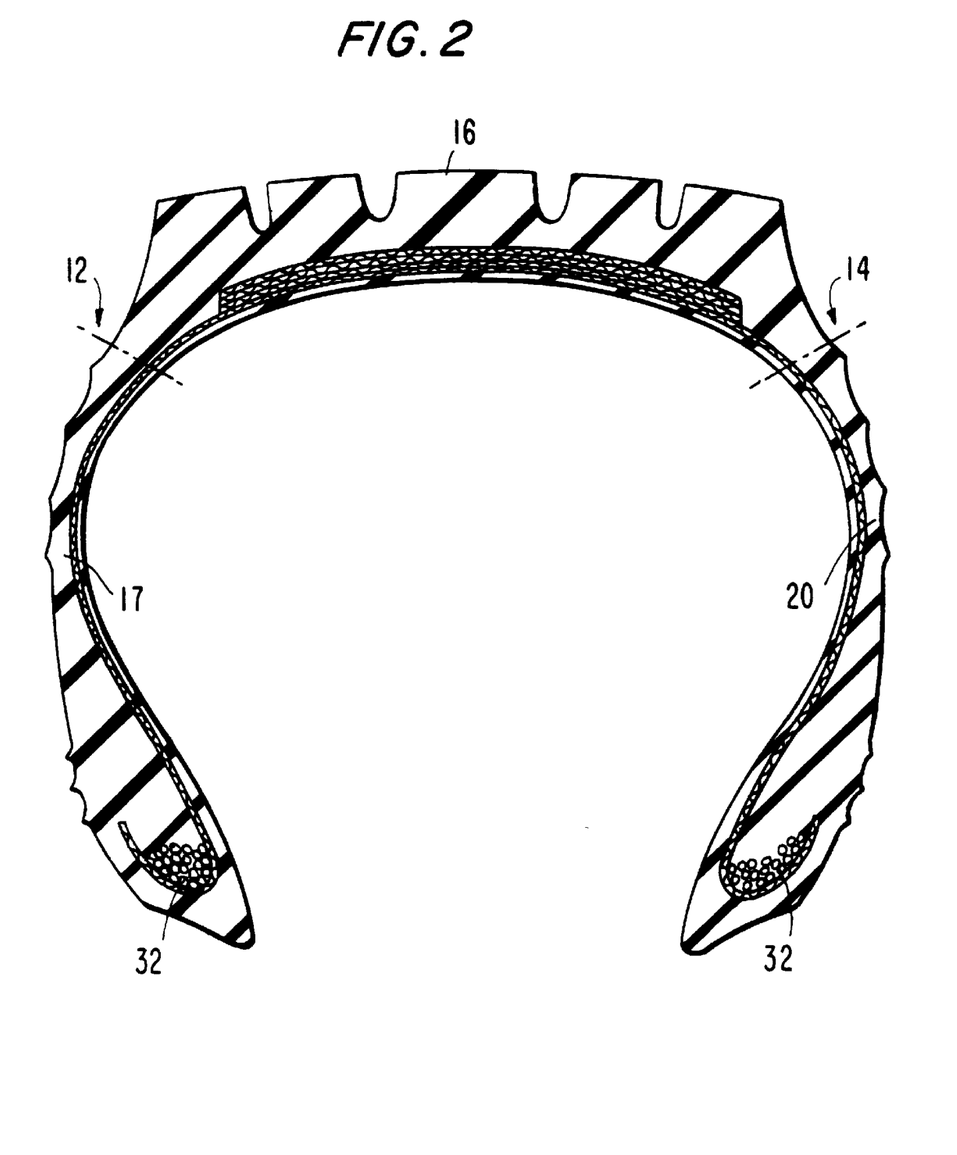
FIG. 2 is a cross-section along 2—2 of FIG. 1.

The sorted used tires that are still serviceable are kept intact for subsequent commercial sale and loaded into the truck. The scrap tires 10 (FIG. 1) are slit transversely (FIG. 2) in two locations 12, 14 to separate the tread 16 from the two sidewalls 18, 20. The sidewalls 18, 20 are first debeaded to leave soft rubber and then shredded to 16–25 mesh in a conventional shredder to provide shredded material 30 (FIG. 3). The metallic beads 32 are extracted in a conventional debeader to be sold as scrap.

Figure 4:
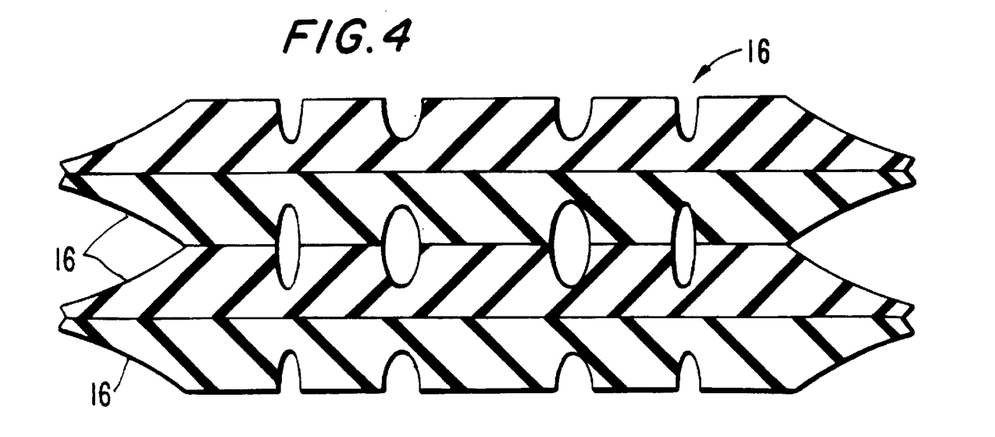
FIG. 4 is an end view of stacked treads.

The tread 16 is cut transversely at the site and laid out flat on the truck storage bed. Treads from other tires are similarly cut, laid out flat and stacked one atop the other on the truck storage bed, such as in the manner of FIG. 4 and are transported to a central recycling facility.

The truck may be equipped with a shredder for shredding the debeaded sidewalls into the shredded material 30 (FIG. 3). The truck may have a container for containing the beads 32 and a container for containing the shredded material 30. In this manner, the debeading and shredding work may be done on-site. Otherwise, the debeading and shredding work is done at the central recycling facility in which case the sidewalls of the tires are stacked one atop the other on the truck storage bed.

Figures 5, 6:
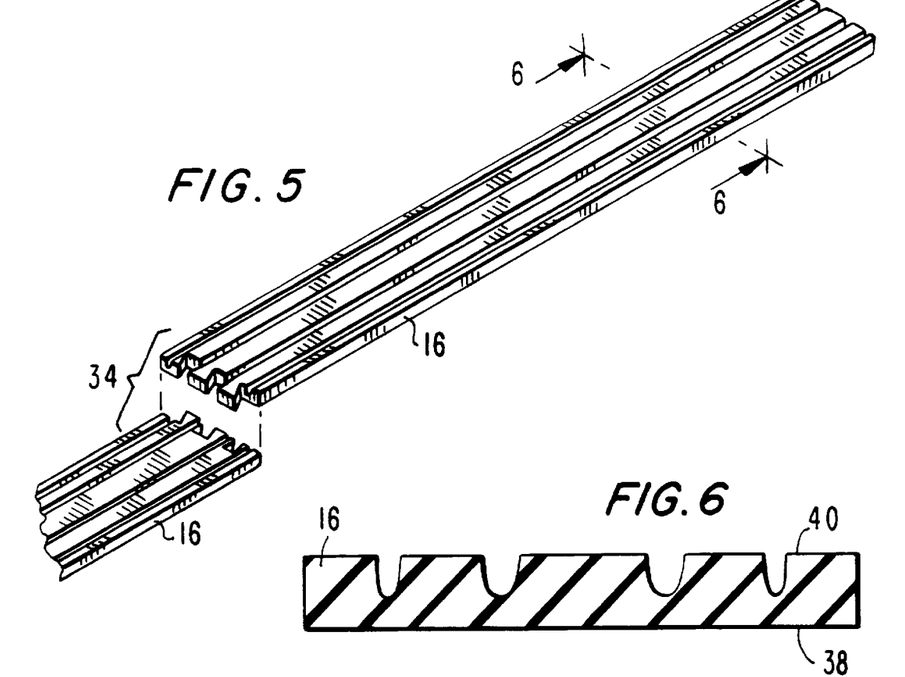
FIG. 5 is a perspective view of two tread segments arranged for connection end to end to each other.
FIG. 6 is a cross-section along 6—6 of FIG. 5.
Figure 7:
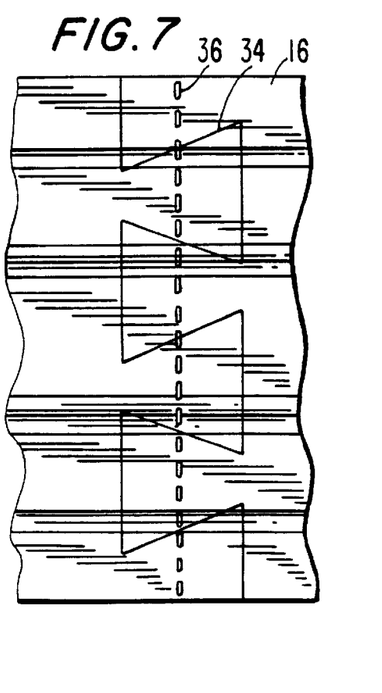
FIG. 7 is a top view of two tread segments connected together end to end.

Once at the central recycling facility, the stacked treads are unloaded from the truck and cut to a uniform width and thickness. Their ends may be cut dovetailed 34 as shown in FIG. 5 and then connected end to end to form a continuous tread strip as shown in FIG. 7. The dovetail connection is then stitched with a nylon or other man-made material stitch 36. The ridge side 38 (as opposed to the tread side 40) requires preparation for bonding to form a two-ply tread strip 42. It is buffed to remove the mold ridges and any trace of the chemical release agent residue present from original manufacture to prepare the inner facing surface for bonding. The ridges provide an uneven surface so buffing will remove them, leaving a flattened surface suitable for bonding. The chemical release agent was applied during original manufacture to facilitate release of the tire from the mold used to form the tire. If one were to rub one's skin on the ridge side of the tire, the chemical release agent comes off and transfers onto the skin.

After buffing is complete, the ridge side 38 may be bonded to the inner facing tire side of another continuous tread strip under elevated heat and pressure conditions with a conventional bonding agent such as by spraying. This newly formed two-ply tread strip 42 (see FIG. 10) is suitable to serve as a substitute for construction material for those applications in which the additional flexibility afforded by the two-ply tread strip over lumber is desirable or does not render a problem in construction. They may be bonded together or otherwise fastened together. If bonded, then the tread sides need to be prepared for bonding by buffing them as well. This removes excess tread as well as the stitch and removes worn edges and sides that may have been rubbed raw. The bonded together strips then form bundles with staggered dovetail connections that may be further processed for use in construction or other applications.

Figure 8A:
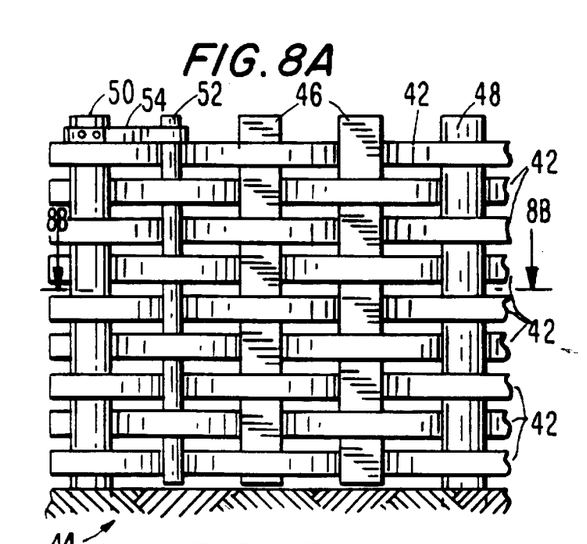
FIG. 8A is a front elevational view of fencing composed of tread strips.
Figure 8B:
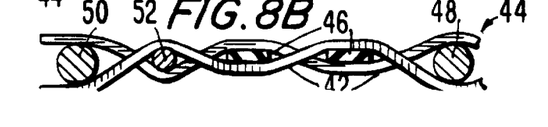
FIG. 8B is a top view of FIG. 8A.

For example, the additional flexibility may be a desirable attribute in security fencing 44, such as that of FIGS. 8A and 8B. The flexibility renders the two-ply tread strip 42 of such fencing extremely difficult to saw with a hack saw because the fencing flexes as the saw is pushed and pulled across it.

As shown in FIGS. 8A and 8B, the fencing 44 preferably has a series of spaced apart vertical strips 46 interleaved by horizontal strips 42 arranged one over the other. At intermediate posts 48, the fencing 44 may be interleaved or wrapped around on one side and on the other side at the next successive post. At the end post 50, the horizontal strips are wrapped on either side of the end post 50 in an alternating manner. A steel rod 52 or other sturdy pole is inserted into the weave so that the last intertwined weave is between the rod 52 and the end post 50. The rod 52 is then forced toward the end post 50, thereby tightening the weave. A hoop or strap 54 is then wrapped around the rod 52 and the end post 50 to retain the rod 52 in this relative position.

Figure 9:
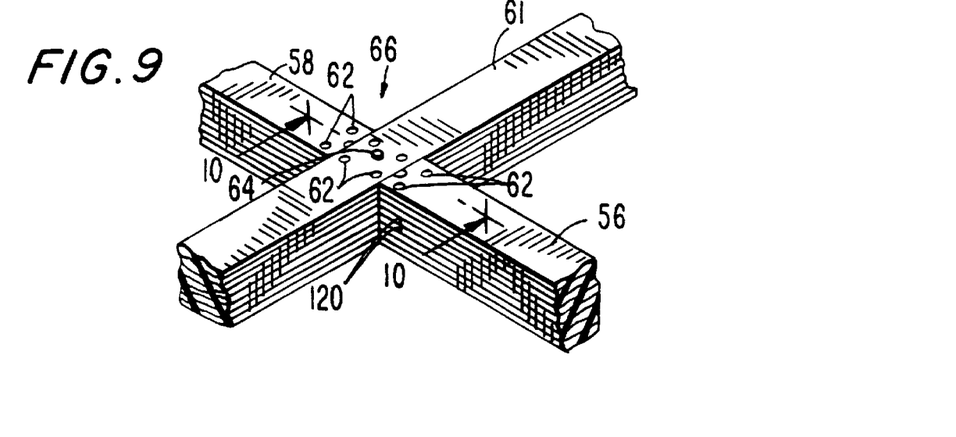
FIG. 9 is a perspective view of a joint connection for two beams each composed of tread segments.
Figure 10:
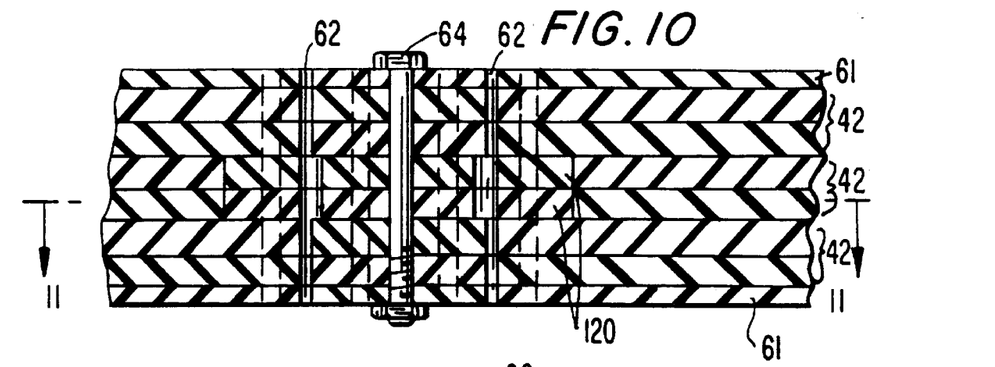
FIG. 10 is a cross-section across lines 10—10 of FIG. 9.
Figure 11:
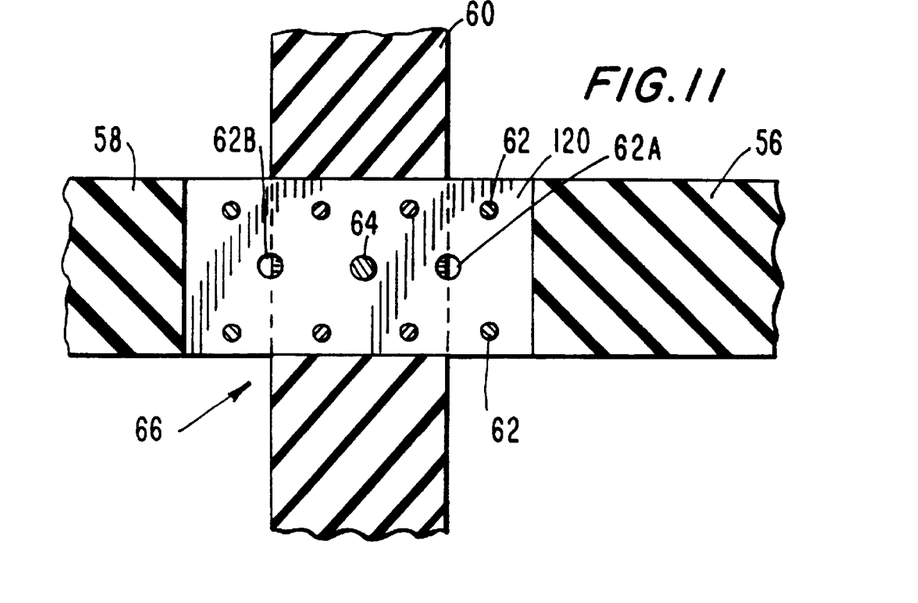
FIG. 11 is a cross-section across lines 11—11 of FIG. 10.

In FIGS. 9–11, two beams 56, 58 and a post 60, each composed of multiple layers of two-ply tread strips 42 all sandwiched between two truck tire casings 61, are joined together with an insert 120. Each has aligned holes 62 with mechanical fasteners 64 securing the assembly together to form an X-connection 66. As best seen in FIG. 11, all the holes 62 will accommodate mechanical fasteners except for holes 62A, 62B in this X-configuration 66, because the post lacks mating half holes. The post 56 has a hollow space into which is fitted the insert 120.

Truck tire casings 61 provide advantages over automobile tires while serving as the outermost side of the sandwich layers. Truck tire casings are by nature larger, thicker and longer than automobile tires and thus require less processing to render them suitable for use, e.g., fewer dovetail connections are needed. Also, using them is a convenient way to salvage them in proportion to their relative numbers in the waste stream, i.e., there are proportionally more automobile tire treads than truck casings used to make the beams and columns in proportion to relative numbers in the waste stream.

FIGS. 12–15 show the formation of a T-connection 70 between a post 60 and a beam 56. Mechanical fasteners 64 are used in the same manner as in the embodiment of FIGS. 9–11. An insert 110 (FIG. 20) is used to join the post 60 and the beam 56. The beam 56 has an end with a central recess 72 into which is fitted the insert 110, which has holes in alignment with those at the ends of the beam 56 and in central region of the post 60. The end of a beam has two holes spaced from the edge and a half hole 74 at the edge.

Figure 16:
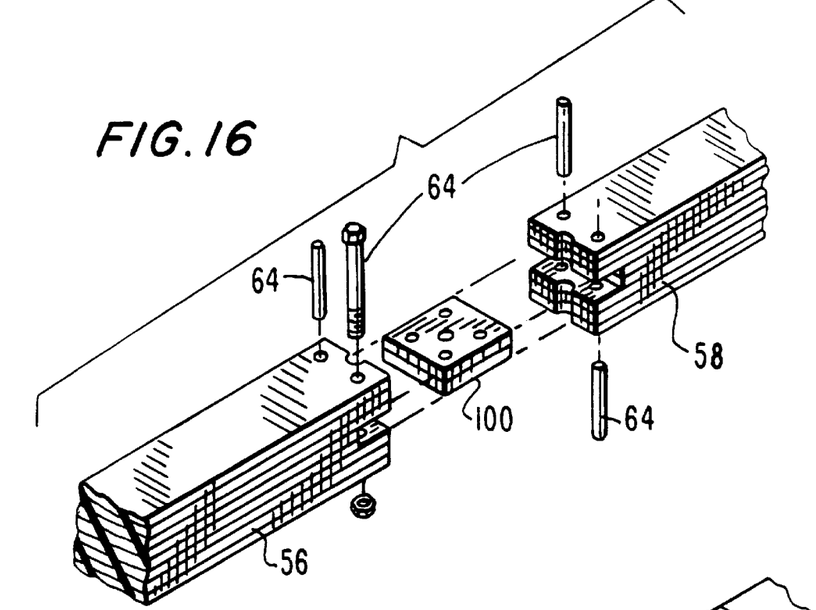
FIG. 16 is a perspective view of a joint connection for a beam to beam connection just prior to joining them end to end, each beam being composed of tread segments.
Figure 17:
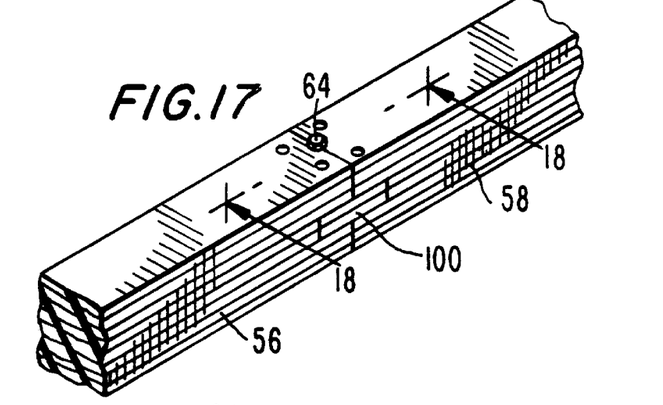
FIG. 17 is a perspective view as in claim 16 except showing the joint connection after joining end to end.
Figure 18:
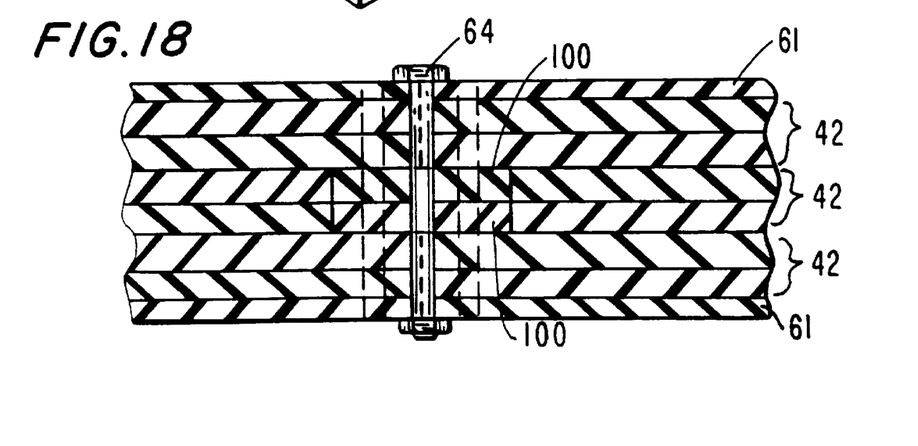
FIG. 18 is a cross-section across lines 18—18 of FIG. 17.

FIGS. 16–18 show the fastening of beams 56, 58 end to end with an insert 100. Mechanical fasteners 64 may be inserted into the aligned holes to ensure a solid and secure fastening.

FIGS. 19–24 show joint inserts of different configurations, each suited for serving as a connector under different conditions.

Figure 19:
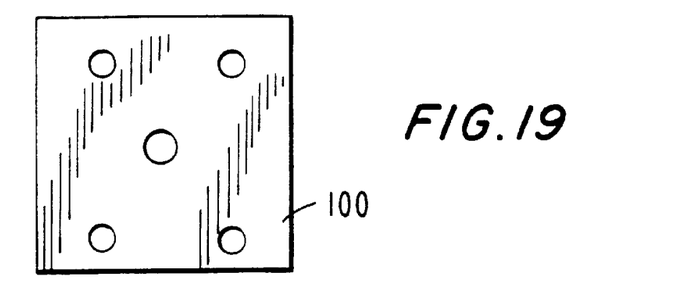
FIGS. 19–24 are schematic representations of different configurations of inserts for joining together beams and/or posts.

FIG. 19 shows the insert 100 suited to join two beams end to end as in FIG. 16.

Figure 12:
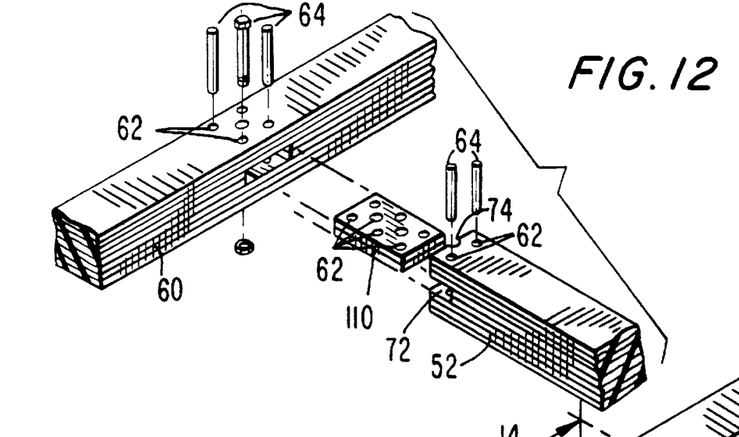
FIG. 12 is a perspective view of a joint connection just prior to joining a post and a beam together, each being composed of tread segments.
Figure 13:
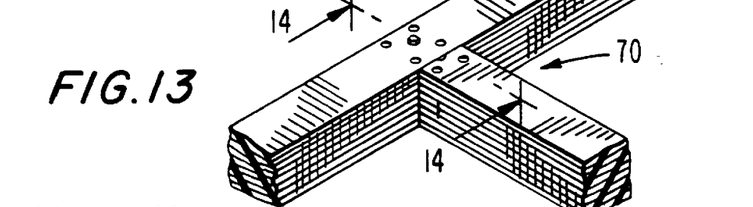
FIG. 13 is a perspective view as in FIG. 12, except showing the joint connection after joining the post and beam together.
Figure 14:
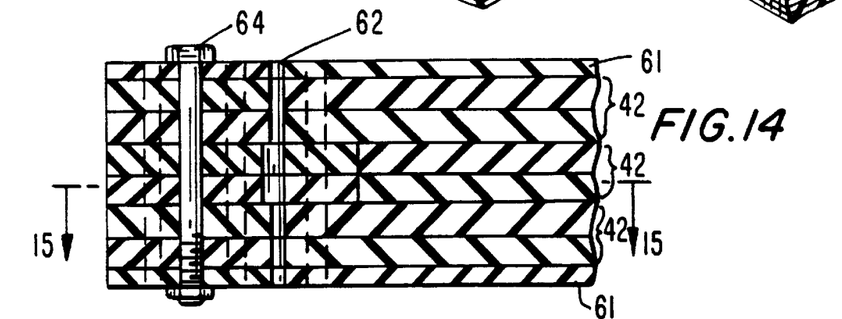
FIG. 14 is a cross-section across lines 14—14 of FIG. 13.
Figure 15:
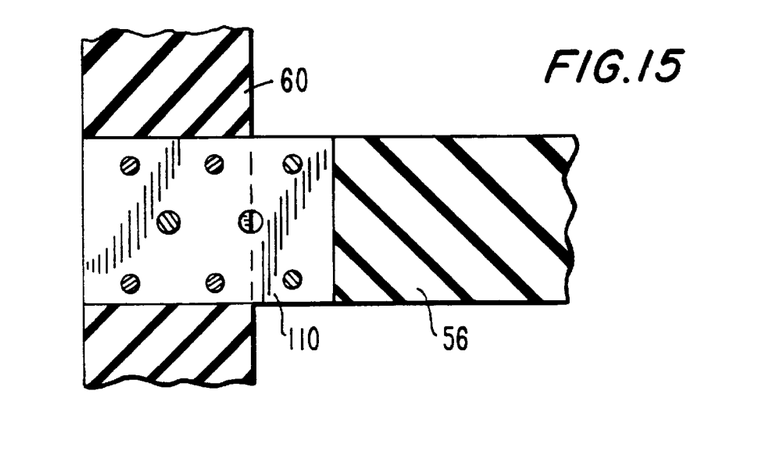
FIG. 15 is a cross-section across lines 15—15 of FIG. 14.
Figure 20:
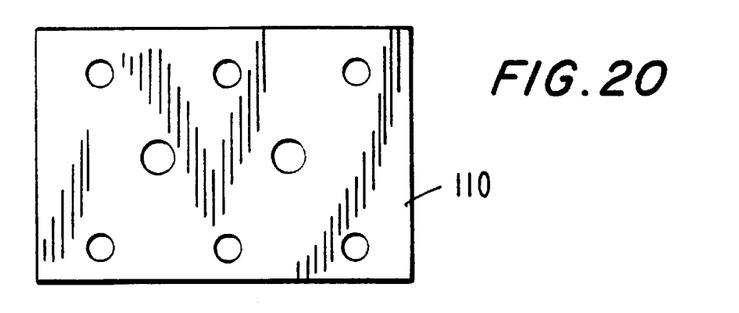

FIG. 20 shows the insert 110 suited to join two beams or a beam and post in a T-connection as in FIG. 12.

Figure 21:
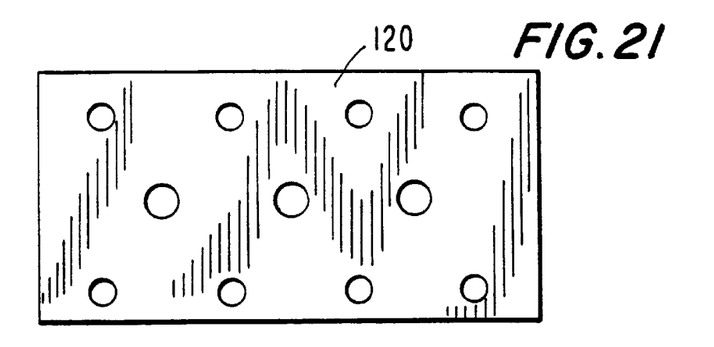

FIG. 21 shows the insert 120 suited to join two beams and a post as in FIG. 9.

Figure 22:
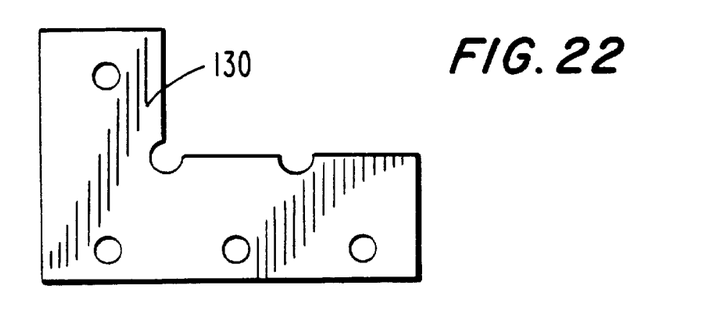
Figure 23:
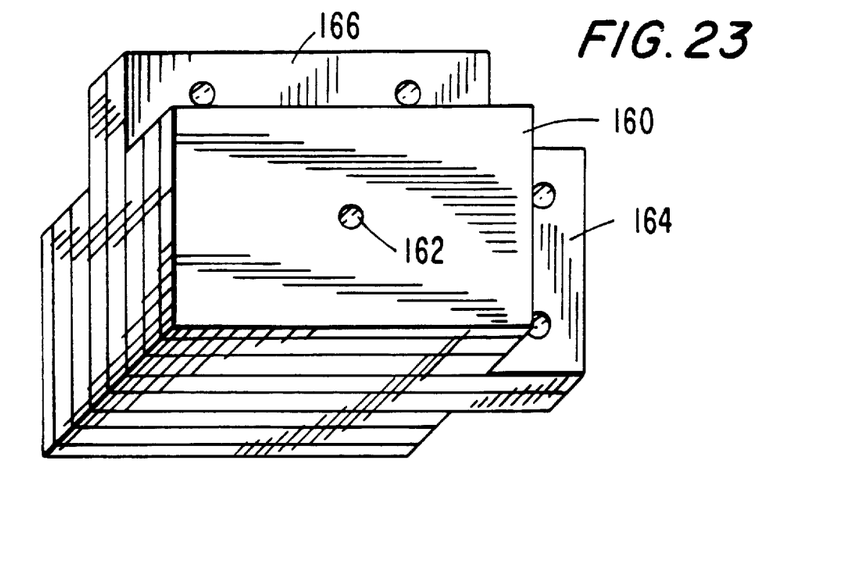
Figure 24:
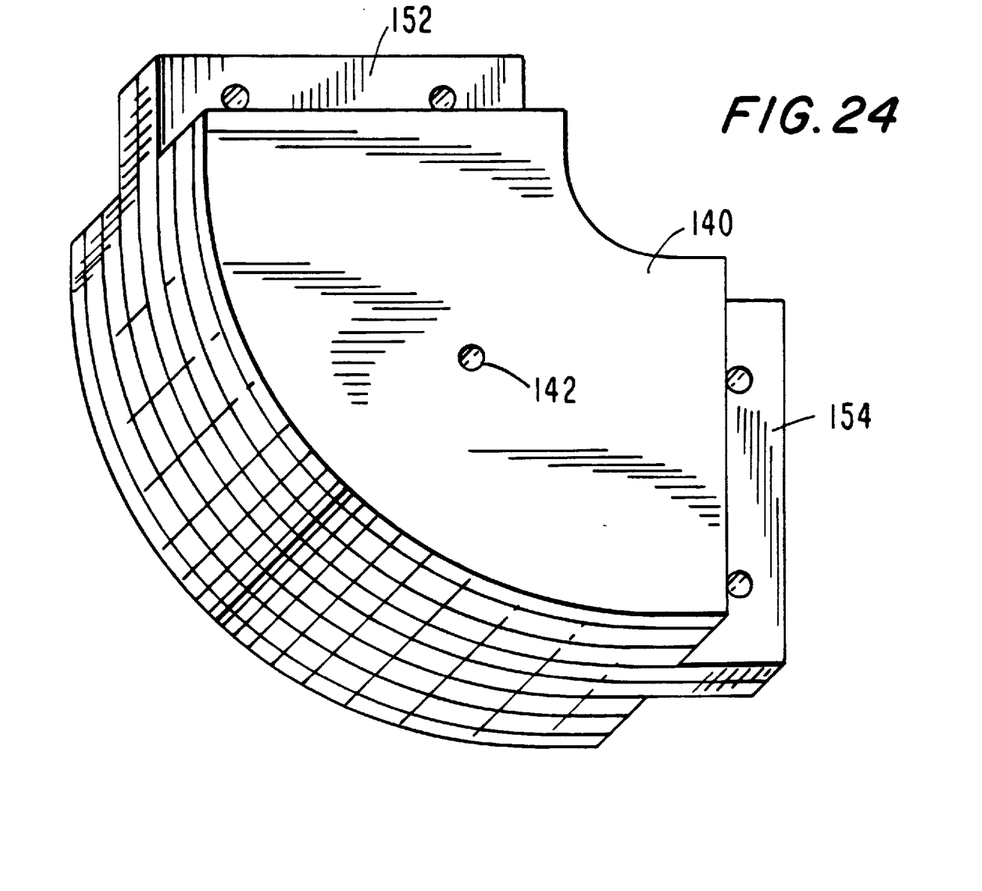

FIGS. 22–24 show inserts that are suitable to serve as corner connections between a beam and post or between two beams. In FIG. 22, the insert 130 is L-shaped. In FIG. 23, the insert 160 is square, with a central through-going hole and two tongues 164, 166. The tongues 164, 166 project at a right angle to each other from the central strips that comprise the insert. In FIG. 24, the insert 140 is curved and has two tongues 152, 154 that project at a right angle to each other. The insert 140 also has a through-going hole 156.

Figure 25:
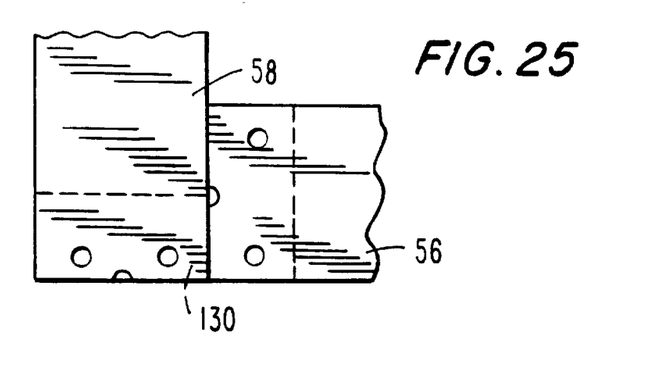
FIG. 25 is a schematic representation of using the L-shaped insert of FIG. 22 as a corner to join two beams.
Figures 26, 27, 28:
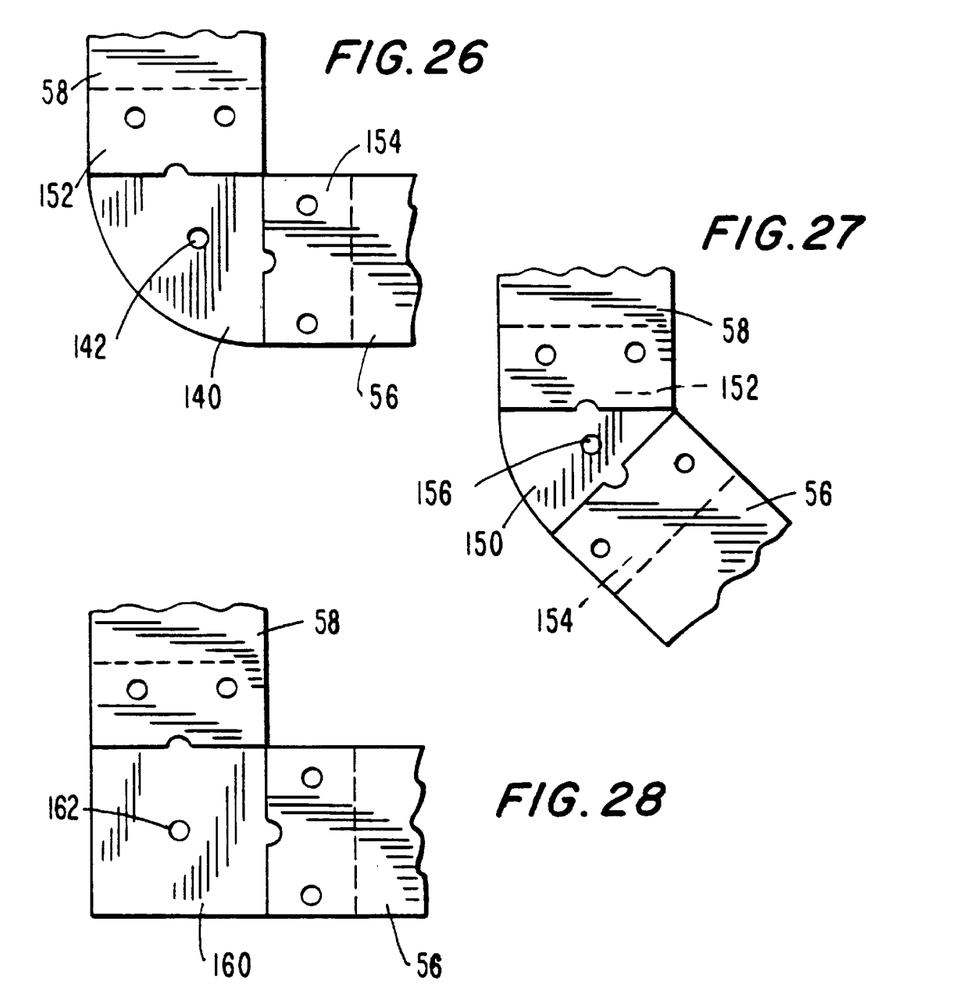
FIG. 26 is a schematic representation of using the curved insert of FIG. 24 as a corner to join two beams.
FIG. 27 is a schematic representation of using the curved insert of FIG. 24 to join two beams at an angle but after shearing the insert down to the appropriate size.
FIG. 28 is a schematic representation of using the rectangular insert of FIG. 23 as a corner to join two beams.

FIG. 25 shows the insert 130 of FIG. 22 securing two beams 56, 58. FIGS. 26 and 27 show the use of the insert of FIG. 23 that is curved serving as the corner connection. The curve may be at any desired angle and cut at the site to the appropriate dimension and angular sweep. Thus, the insert 140 of FIG. 23 may be cut to the shape of insert 150 of FIG. 27. Each of these inserts 140, 150 should have their own central through-going hole 142, 156 through which a mechanical fastener or pin may be inserted to hold the insert assembly together.

Since the inserts 140, 150 each use a tongue 152, 154 (see FIGS. 24, 26 and 27), cutting the insert at a site to configure the insert to suit connection between two angled beams is simplified because the portions of the insert that sandwich the tongue may be sheared off with an appropriate shearing tool. Note that the tongues 152, 154 in the embodiment of FIG. 27 project at an angle relative to each other that corresponds to the angle between beams 56, 58, which in the case of FIG. 27 is oblique.

FIG. 28 shows the use of an insert 160 of FIG. 23, which allows the ends of the beams 56, 58 to face the insert 160, instead of one end of beam 56 facing beam 58 as in FIG. 25. As in the embodiments of FIGS. 23 and 24, a central through-going hole 162 is provided to allow insertion of a mechanical fastener to help hold the insert assembly together.

Figure 29:
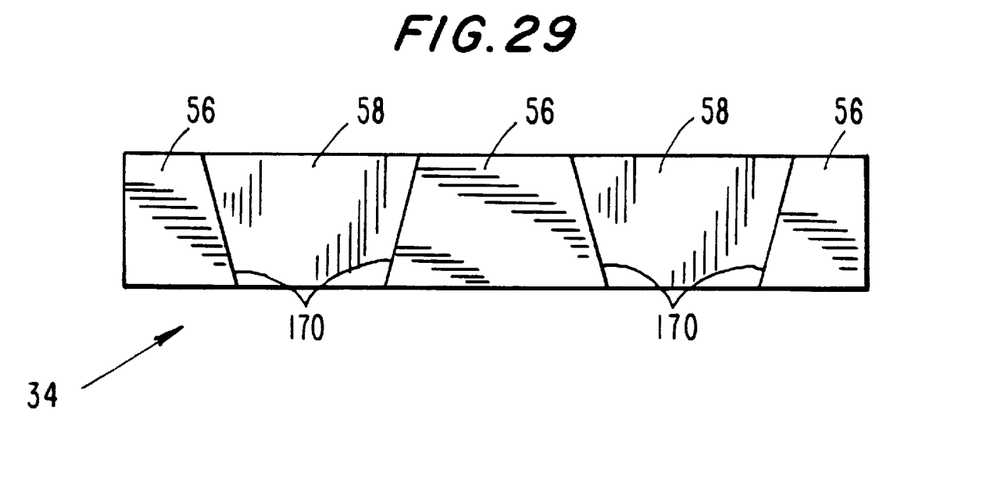
FIG. 29 is a schematic representation of joining dovetail ends in accordance with an embodiment.
Figure 30:
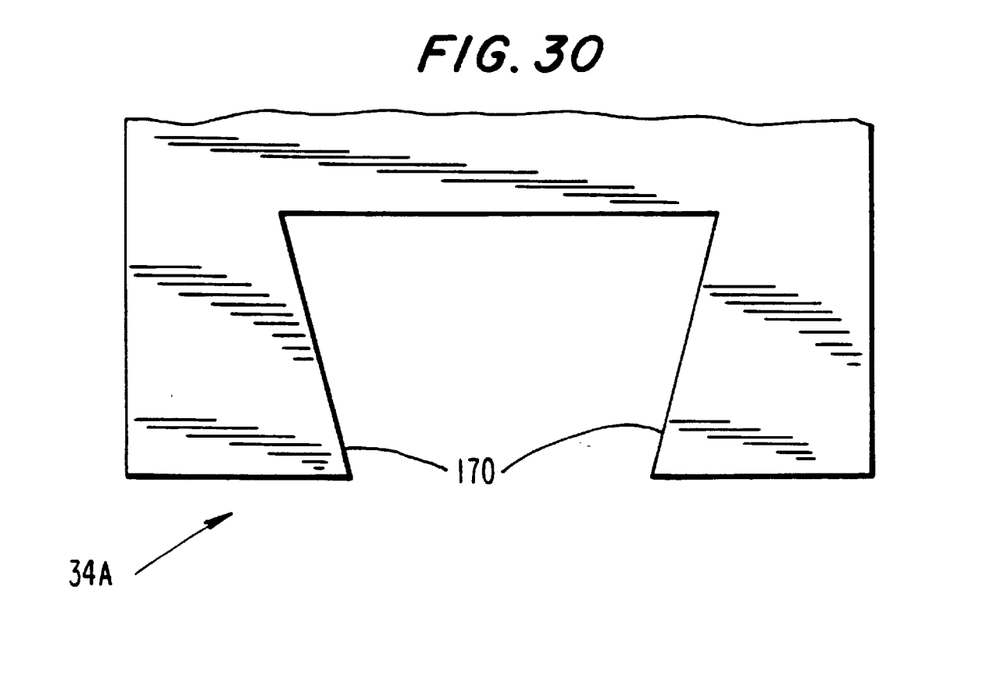
FIG. 30 is a schematic representation of a dovetail connection in accordance with a further embodiment.

FIG. 29 shows the dovetail connection 34 of FIG. 7. FIG. 30 shows an alternative dovetail cut 34A. In both cases, the dovetail is formed by shaping the end of the strip to have at least one recess that has two sidewalls 170 that diverge from an outer edge of the strip to the recessed edge.

The beams and posts have further application in marine environments, such as dock or mooring facilities. Since the tread material is essentially resistant to corrosion attacks in sea water, unlike the case for metal or wood that must be coated or treated with tar or the like, its use in marine environments will lessen maintenance. In addition, boats currently rely on placing tires along their sides to buffer themselves against damage when mooring at a dock. By constructing the mooring area with this tread strip material of the present invention, the boats may bounce off it upon collision, but neither will be damaged by the impact under normal docking speeds.

While the foregoing description and drawings represent the preferred embodiments of the present invention, it will be understood that various changes and modifications may be made without departing from the spirit and scope of the present invention.

What is claimed is:

1. A used tire tread manufacture, comprising two used tire tread strips bonded face-to-face each of uniform width and thickness, each of said strips being composed of tire trade segments joined end to end with dovetail connections, said strips each having a tread side with treads and a smooth side facing away from said tread sale, said smooth sides being bonded to each other, said tire tread strips being configured into an insert to join two beams together, said insert having a plurality of through going holes numbering at least five, and two beams being joined end to end with said insert.

2. A manufacture as in claim 1, wherein said tire tread strips are configured into a beam having two ends each with a protruding portion, each of said protruding portions having at least two through-going holes and a grooved edge that when mated with a like grooved edge of the same configuration and dimension together form a through-going hole.

3. A used tire tread manufacture, comprising two used tire tread strips bonded face-to-face each of uniform width and thickness, each of said strips being composed of tire trade segments joined end to end with dovetail connections, said strips each having a tread side with treads and a smooth side facing away from said tread sale, said smooth sides being bonded to each other, said tire tread strips being configured into an insert to join two beams together, said insert having a plurality of through going holes numbering at least seven, and two beams being joined together as a T-connection with said insert.

4. A used tire tread manufacture, comprising two used tire tread strips bonded face-to-face each of uniform width and thickness, each of said strips being composed of tire trade segments joined end to end with dovetail connections, said strips each having a tread side with treads and a smooth side facing away from said tread sale, said smooth sides being bonded to each other, said tire tread strips being configured into an insert to join two beams together, said insert having a plurality of through going holes numbering at least nine, and three beams being joined as an X-connection, one of said beams having a through-going space, said insert being fitted into said space to project out of said space on both sides, each of a remainder of two of the beams being connected with said insert at a respective one of said both sides.

5. A used tire tread manufacture, comprising two used tire tread strips bonded face-to-face each of uniform width and thickness, each of said strips being composed of tire trade segments joined end to end with dovetail connections, said strips each having a tread side with treads and a smooth side facing away from said tread sale, said smooth sides being bonded to each other, said tire tread strips being configured into an insert to join two beams together at a corner, said insert being L-shaped and having a plurality of through-going holes.

6. A used tire tread manufacture, comprising two used tire tread strips bonded face-to-face each of uniform width and thickness, each of said strips being composed of tire trade segments joined end to end with dovetail connections, said strips each having a tread side with treads and a smooth side facing away from said tread sale, said smooth sides being bonded to each other, said tire tread strips being configured into an insert having two protruding portions that extend at right angles to each other and each having at least two sides.

7. In combination a used tire transport and used tires, comprising a stack of used tire treads free of sidewalls and laid one atop the other in a planar manner;

a stack of used sidewalls free of the used tire treads and laid one atop the other and apart from said stack of used tire treads; and a transport vehicle carrying both the stack of used tire treads and the stack of used sidewalls.

8. A combination as in claim 7, further comprising cutting and loading equipment on said vehicle transport, said equipment being operable to load and cut used tires to form each of said stacks.

9. A combination as in claim 8, wherein said cutting equipment includes a cutter that separates the tire treads from the sidewalls and a cutter that slits the tire treads transversely.

10. A combination as in claim 9, wherein said cutting equipment includes a cutter that separates treads from sidewalls, a cutter that slits tire treads transversely, a sidewall debeader and a sidewall shredder.

11. A combination used tire transport and used tires, comprising:

a stack of used tire treads free of sidewalls and laid one atop the other in a planar manner;

shredded used sidewalls; and a transport vehicle carrying both the stack of tire treads and the shredded used sidewalls.

12. A combination as in claim 11, further comprising cutting and loading equipment on said vehicle transport, said equipment being operable to load and cut used tires to form each of said stacks.

* * * * *